(No Model.)

C. W. McKELVEY.
MOWING MACHINE.

No. 305,833. Patented Sept. 30, 1884.

Attest:
J. Walter Fowler
H. B. Applewhaite

Inventor;
C. W. McKelvey
By Dewey & Co.
Attorneys

UNITED STATES PATENT OFFICE.

CHRISTOPHER W. McKELVEY, OF PORTERSVILLE, CALIFORNIA, ASSIGNOR OF ONE-FOURTH TO ROBERT BAKER, OF SAME PLACE.

MOWING-MACHINE.

SPECIFICATION forming part of Letters Patent No. 305,833, dated September 30, 1884.

Application filed May 1, 1884. (No model.)

*To all whom it may concern:*

Be it known that I, C. W. McKELVEY, of Portersville, county of Tulare, and State of California, have invented an Improvement in Mowing-Machines; and I do hereby declare the following to be a full, clear, and exact description thereof.

My invention relates to certain improvements in mowing-machines; and it consists in a supplemental cutter extending upward from the outer end of the main horizontal cutter and moving in unison therewith, a mechanism for communicating motion to it from the main cutter-bar and causing it to reciprocate, and the arrangement of this mechanism upon the outer side of the shoe, so that the two cutters approach nearly to each other, and the cut grass is allowed to escape freely without clogging.

Figure 1:
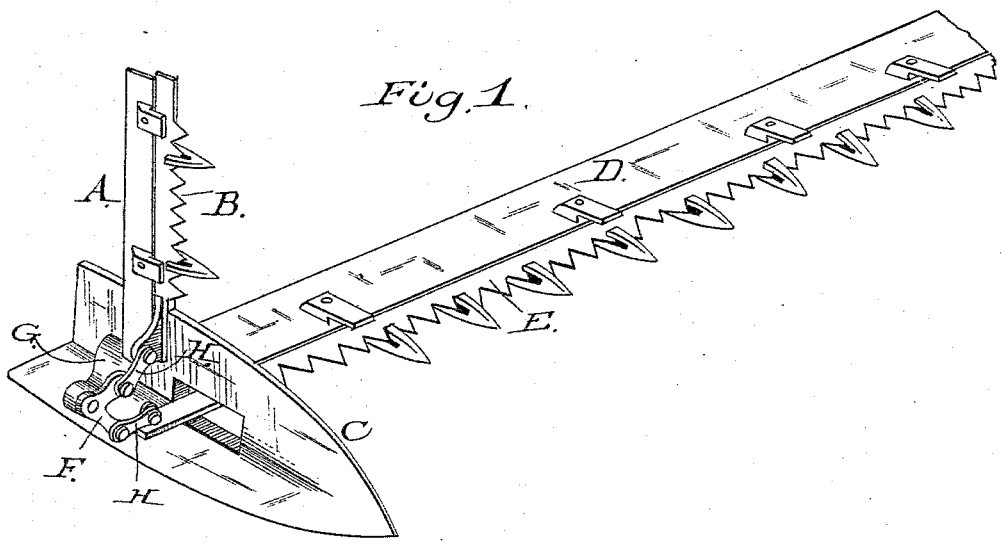
Figure 2:
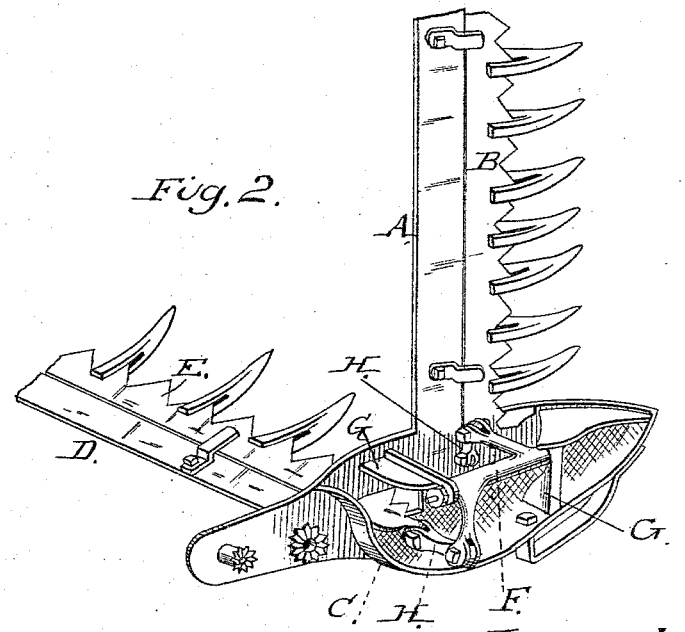

Referring to the accompanying drawings for a more complete explanation of my invention, Figure 1 is a perspective view of a horizontal cutter-bar, showing the shoe and trackclearer at the outer end and the supplemental cutter. Fig. 2 is a similar view showing a modified form of my improvement.

In mowing tangled or lodged grass, it is difficult to separate that which has been cut from that which remains uncut, and it causes a strong side draft upon the machine. To overcome this difficulty, vertical cutters have been connected with the outer end of the main cutter-bar, and a quadrant-gear has been mounted inside the shoe, between the meeting ends of the cutters, to drive the vertical one by the movement of the horizontal one. This mechanism, occupying a space on the inner side of the shoe, prevents a free escape of the cut grass, which I overcome in my invention by such a construction of parts that the actuating mechanism is simplified, and is placed on the outer side of the shoe.

D is the main finger-bar, with guards or fingers through which the sickle or cutter-bar E is caused to reciprocate by means of mechanism driven from the bearing-wheels or in any suitable or well-known manner.

C is a shoe fixed to the outer end of the main finger-bar, the lower part being adapted to move over the surface of the ground, the front part pointed, and the inner side extending vertically upward and backward to form a guide in the usual manner. This inner vertical side is slotted near the bottom, to allow the end of the sickle-bar to reciprocate through it. The sickle-bar is connected by a link, H, with one arm of a bell-crank lever, F. This lever has its two arms connected at right angles with a sleeve of sufficient length to form a steady support, and a fulcrum-pin passes through it and into the standards or supports G G, which project from the shoe, as shown in Fig. 2. The finger-bar A is fixed to the vertical side of the shoe, and extends upward in nearly or quite a vertical line from the shoe; or it may incline slightly outward, if desired. This finger-bar has guard-fingers projecting forward, and a sickle, B, is fitted to reciprocate within the guards, with its cutting-edges toward the front. The lower end of this sickle is connected by a link, H, with the arm of the bell-crank F, which arm is at right angles with the one which is connected with the main sickle, and it is thus driven in the vertical direction. The adjacent ends of the two sickles are thus brought closely together, and a smooth angle is formed between them, so that the grass is cut closely and escapes freely between them without clogging. The bell-crank lever and connecting-links are contained and protected in the space in the shoe outside the inner vertical plate of the same, and are out of the way of the cut grass, and may be easily reached at any time for repairs or oiling. The coupling-links permit a free movement of the parts.

Having thus described my invention, what I claim as new, and desire to secure by Letters Patent, is—

1. In a mowing-machine, the combination of a horizontal main and a vertical supplemental sickle, and the means for uniting them so that they reciprocate simultaneously, consisting of the bell-crank lever F, having the vertical and horizontal arms and the coupling-links H H.

2. In a mowing-machine the combination of the shoe, the horizontal and vertical fingerbars secured to the lower and inner vertical sides of the shoe C, and provided with fingerguards, the sickles moving within said guards, a bell-crank lever, and links by which its ends are connected with the sickles, said lever and links being situated outside the line of the vertical cutter.

3. In a mowing-machine having a horizontal sickle and a supplemental vertical sickle, the combination of the shoe, the finger-bars fixed to the vertical and lower side of said shoe, respectively, as shown, a bell-crank lever connecting the two sickles so as to move simultaneously, and standards exterior to the shoe, by which the connecting mechanism is supported outside the line of the vertical cutter, substantially as described.

In witness whereof I have hereunto set my hand.

CHRISTOPHER W. McKELVEY.

Witnesses:
S. H. NOURSE,
G. W. EMERSON.